United States Patent
De Langen et al.

(10) Patent No.: US 8,200,100 B2
(45) Date of Patent: Jun. 12, 2012

(54) SYSTEMS AND METHODS FOR DIAGNOSTIC MONITORING OF OPTICAL MODULATION AMPLITUDE AT AN OPTICAL RECEIVER USING AUTOMATIC GAIN CONTROL

(75) Inventors: Jos De Langen, Singapore (SG); Tze Wei Lim, Singapore (SG); Adrianus J. P. Van Haasteren, Singapore (SG)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 606 days.

(21) Appl. No.: 12/355,919

(22) Filed: Jan. 19, 2009

(65) Prior Publication Data

US 2010/0183296 A1 Jul. 22, 2010

(51) Int. Cl.
*H04B 10/06* (2006.01)

(52) U.S. Cl. ........ 398/210; 398/209; 398/208; 398/202; 398/16

(58) Field of Classification Search ............. 398/210, 398/209, 208, 202, 16
See application file for complete search history.

(56) References Cited

U.S. PATENT DOCUMENTS

| | | | |
|---|---|---|---|
| 6,922,231 | B1 | 7/2005 | Wang et al. |
| 7,045,752 | B2 | 5/2006 | Posamentier et al. |
| 2004/0136421 | A1* | 7/2004 | Robinson et al. .......... 372/38.02 |
| 2006/0202765 | A1* | 9/2006 | Gan et al. ...................... 330/308 |
| 2007/0248360 | A1 | 10/2007 | Woolf et al. |
| 2008/0069569 | A1 | 3/2008 | Nelson et al. |
| 2008/0226288 | A1 | 9/2008 | Miller |

OTHER PUBLICATIONS

Application Note 2710: HFAN-02.2.2: Optical Modulation Amplitude (OMA) and Extinction Ratio, Rev1, Apr. 2008, pp. 1-5, Maxim Integrated Products, available at http://www.maxim-ic.com/appnotes.cfm/an_pk/2710.

* cited by examiner

*Primary Examiner* — Kinam Park (57) ABSTRACT

Optical receivers and a method for providing a diagnostic measurement of optical modulation amplitude at other than a signal output of an optical receiver are invented and disclosed. The method includes the steps of applying a representation of an output of an optical detector to a circuit that determines a difference between a first signal level and a second signal level that is different from the first signal level and buffering the difference between the first signal level and the second signal level received from the circuit. The optical receivers include an optical detector, a transimpedance amplifier that applies automatic gain control, a circuit that determines a difference between two signal values and a limiting post amplifier. The receivers provide a diagnostic measure that can be compared to certain thresholds relating to known bit error rates or applied in a calculation to generate an absolute optical modulation amplitude value.

12 Claims, 7 Drawing Sheets

SYSTEMS AND METHODS FOR DIAGNOSTIC MONITORING OF OPTICAL MODULATION AMPLITUDE AT AN OPTICAL RECEIVER USING AUTOMATIC GAIN CONTROL

BACKGROUND

Figure 1:
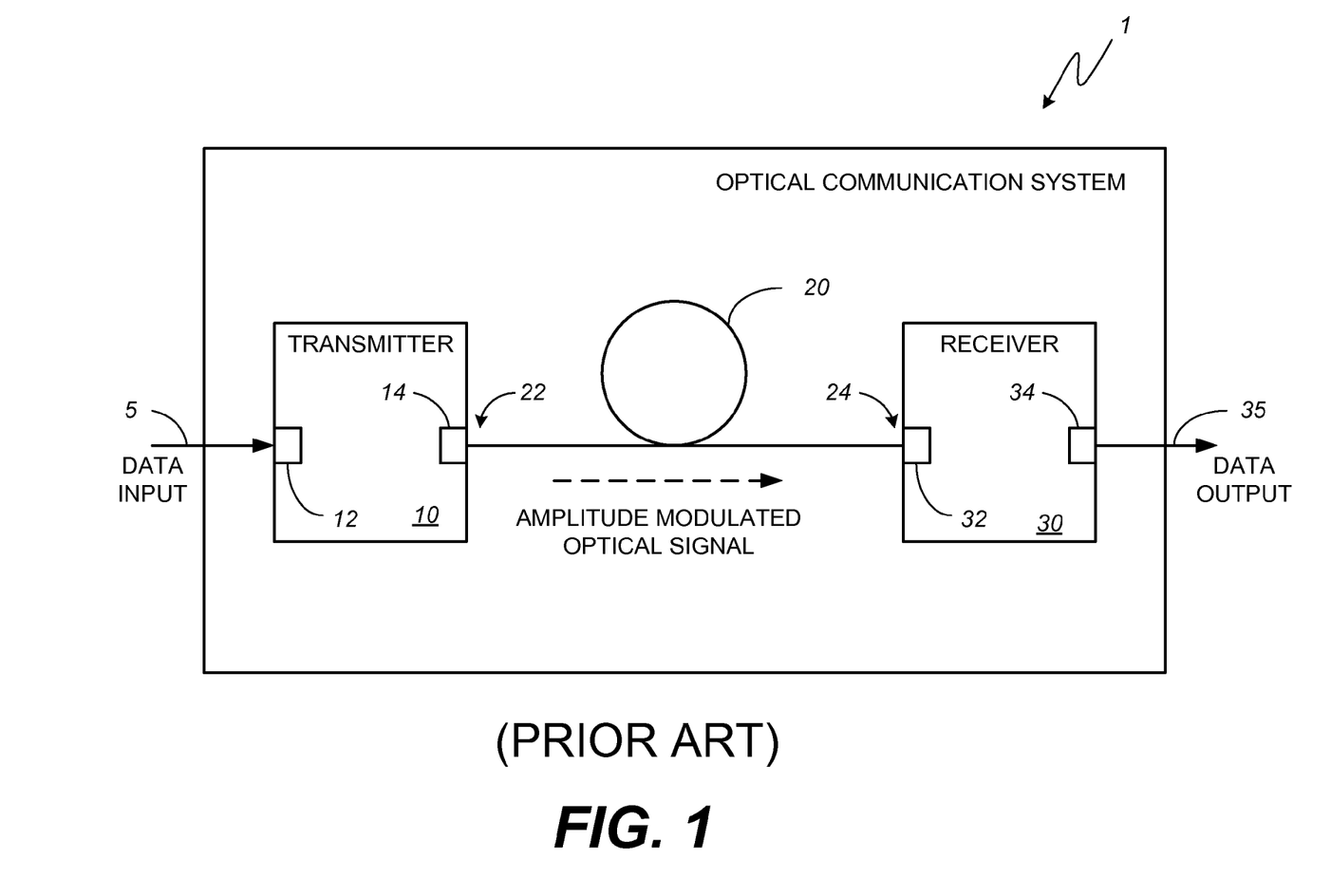
FIG. 1 is a simplified functional block diagram of a conventional optical communication system.

A conventional optical communication system is illustrated in FIG. 1. The optical communication system 1 comprises a transmitter 10, an optical medium 20 (e.g., an optical fiber, a waveguide, free space, etc.), and a receiver 30. The optical communication system 1 receives a data input on connection 5 and generates a data output that is applied on connection 35. The transmitter 10 includes a data input 12 and an optical output 14. The receiver 30 includes an optical input 32 and a data output 34. The optical medium 20 has a first end 22 that is coupled to the optical output 14 and a second end 24 that is coupled to the optical input 32. The transmitter 10 receives data in an electrical format and couples an amplitude-modulated optical representation of the data on the optical medium 20. The receiver 30 receives the amplitude modulated optical representation of the data from the optical medium 20 and converts the same to an electrical representation of the received data.

The optical modulation amplitude (OMA) of a data signal is an important parameter that is used in specifying the performance of optical links used in digital communication systems. At a given receiver noise floor, the OMA directly relates to the bit error ratio (BER) of a communication system.

Figure 2:
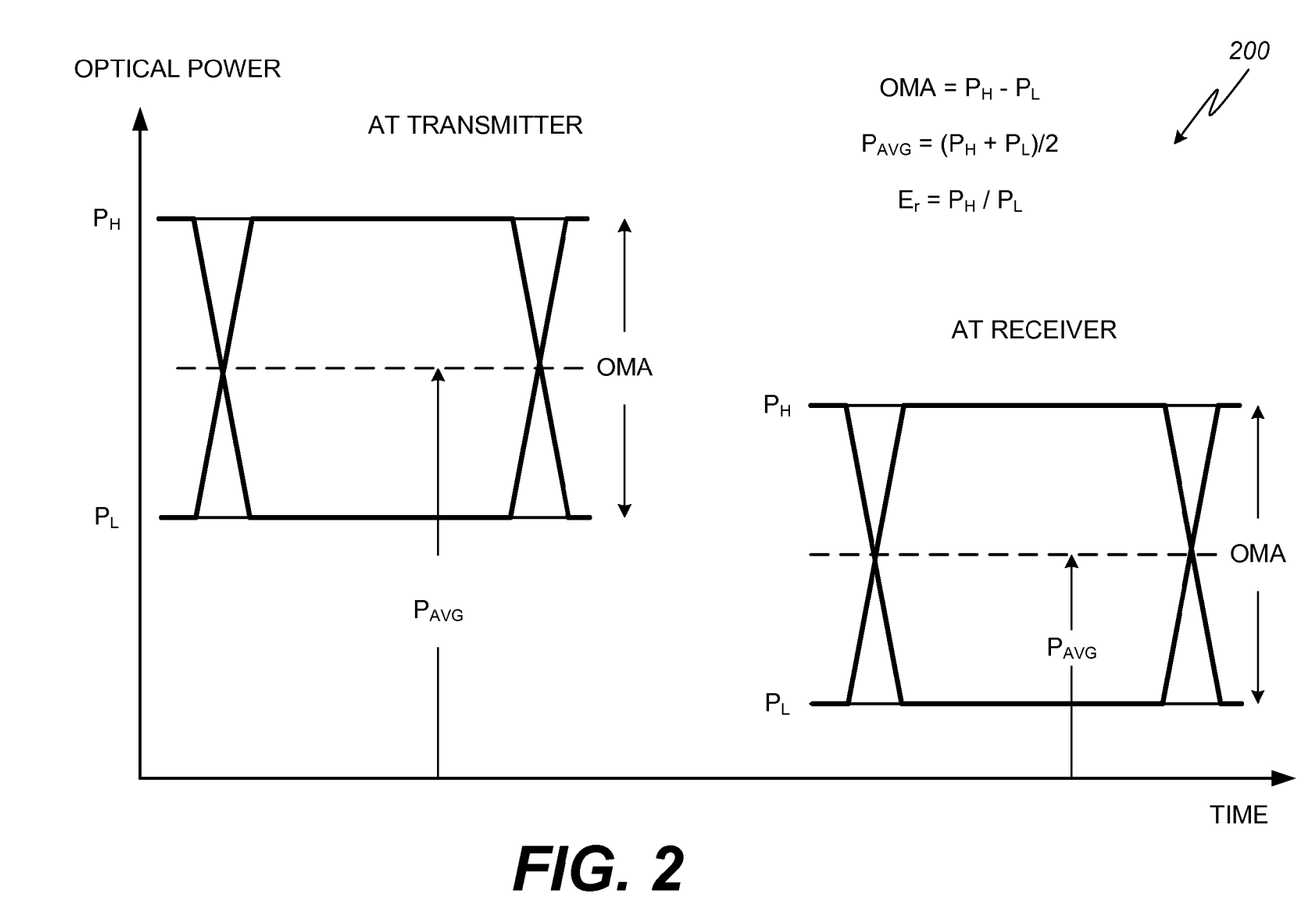
FIG. 2 is an embodiment of an example plot of optical power versus time for the transmitter and the receiver of the optical communication system of FIG. 1.

In bipolar non-return to zero (NRZ) optical signaling schemes, only two discrete optical power levels are used. The higher level or $P_H$ and the lower level or $P_L$. FIG. 2 includes a plot 200 of optical power versus time for both the transmitter 10 and the receiver 30 of FIG. 1. As illustrated in FIG. 2, OMA is defined as the difference between the high and low power levels, which can be represented mathematically as:

$$OMA = P_H - P_L \quad \text{Equation 1}$$

Average signal power is simply the average of the high and low power levels, i.e., $$P_{AVG} = \frac{P_H + P_L}{2} \quad \text{Equation 2}$$

The extinction ratio (ER) is the ratio between the high and low power levels:

$$ER = \frac{P_H}{P_L} \quad \text{Equation 3}$$

From Equation 1, Equation 2 and Equation 3, the following relationship can be derived:

$$OMA = 2P_{AVG}\left[\frac{ER-1}{ER+1}\right] \quad \text{Equation 4}$$

OMA and ER by themselves are relative quantities, since they specify the difference and a ratio of power levels, respectively. To derive an absolute quantity from the OMA or ER an additional point of reference, such as $P_{AVG}$, $P_H$, or $P_L$, is required. Each of the relationships defined in Equations 3 and 4 depend on one of these additional points of reference.

For example, an OMA of 100 µW can correspond to an infinite number of possible values for $P_{AVG}$, $P_H$, or $P_L$. $P_H$ could be 100 µW with $P_L$ equal to 0 µW, or $P_H$ could be 150 µW with $P_L$ equal to 50 µW, or $P_H$ could be 100 mW with $P_L$ equal to 99.9 mW, etc.

In the alternate case of ER, a similar example using an ER=10 can correspond to an infinite number of possible values for $P_{AVG}$, $P_H$, or $P_L$. $P_H$ could be 100 µW with $P_L$ equal to 10 µW, or $P_H$ could be 150 µW with $P_L$ equal to 15 µW, or $P_H$ could be 100 mW with $P_L$ equal to 10 mW, etc.

If in addition to OMA and ER a reference point of $P_{AVG}$=100 µW is specified, then the ambiguity has been removed. With an OMA of 100 µW and $P_{AVG}$=100 µW, $P_H$ can only be 150 µW and $P_L$ can only be 50 µW. If the ER is 10 and $P_{AVG}$=100 µW, then $P_H$ can only be 182 µW and $P_L$ can only be 18.2 µW.

While it may seem apparent that OMA and ER are nearly equivalent, there are differences. One of these differences is how OMA and ER change as a signal propagates through an optical communication system. Assuming an optical communication system with linear attenuation between two points, the ER will stay constant as the signal is attenuated, while the OMA will change by a factor equal to the attenuation. For example, over 10 km of optical fiber with an attenuation of 0.3 dB/km, the total attenuation over 10 km is 3 dB, which is equivalent to a factor of 2. A signal transmitted through the optical fiber that starts with $P_H$ of 1 mW and $P_L$ of 0.1 mW, has an ER of 1/0.1=10 and an OMA=1−0.1=0.90 mW at the input to the optical fiber. At the output of the optical fiber, $P_H$ is 0.5 mW and $P_L$ of 0.05 mW (both are reduced by a factor of two). Therefore, ER is 0.5/0.05=10 and OMA=0.5−0.05=0.45 mW. Thus, ER is the same and OMA is reduced by a factor of two. Once the ER is known, an average power measurement from anywhere in the optical communication system will yield enough information to calculate $P_H$, $P_L$ and OMA. On the other hand, a measure of OMA at any point in the system does not provide enough information to determine the OMA at another point in the system without knowing the magnitude of the attenuation or measuring additional parameters (such as $P_{AVG}$, $P_H$, or $P_L$).

To optimize BER performance of an optical communication link, the OMA should be as large as possible. In optical communication links there are upper and lower limits on $P_{AVG}$ and OMA. In an optical receiver, there is an upper limit on the optical power that can be received. When the received optical power exceeds this upper limit, saturation effects degrade BER performance. For optimum receiver BER performance, the OMA should be as large as possible while avoiding the upper power limit, which occurs when $P_L$ is zero and $P_H$ is just below the upper power limit. For optical transmitters that use a laser as a light source, it is difficult to reduce $P_L$ to zero. When a laser is switched from a completely off state to an on state, turn-on delay and relaxation oscillation negatively affect the communication link. If the laser is biased above its threshold level so that it is always on, problems with turn-on delay and relaxation oscillation decrease. For this reason, practical laser transmitters emit some optical power at $P_L$. A complicating factor is that the laser threshold changes significantly with temperature, making it difficult to keep the difference between the bias and the threshold constant. Precise control of the bias current over a large temperature range adds significant complexity and cost to optical transmitters.

For conventional optical communication links that use relatively low-loss multimode fiber as the communication medium, a combination of the ER and the average power at the transmitter has provided an adequate measure of communication link quality. For optical communication applications that use large-core fiber (e.g., polymer optical fiber (POF)) the combination of ER and average power at the transmitter does not provide an adequate measure of optical communication link quality. While POF is inexpensive and easy to terminate with common tools and ordinary polishing paper, POF attenuates more and provides less bandwidth when compared to an optical fiber of similar length made from silica. Communication links using POF have been used in industrial control applications, robotics, and automotive applications where signaling rates are much lower than those used in high-speed telecommunication applications. The relatively low signaling rates, which enable simple and inexpensive light-emitting diode (LED) based transmitters, has proved to be a significant factor in market acceptance and penetration for POF communication based systems. However, there is a demand in industrial automation applications to use the Fast Ethernet data transfer protocol (100 Mbps) over POF links up to 50 meters long and hard cladded silica (HCS) links up to 100 meters long. Beyond these distances, the bandwidth of standard 0.5 numerical aperture (NA) POF and 0.37 NA HCS links will not support Fast Ethernet communications. The limited bandwidth of POF and HCS communication links, even at the desired maximum distances, renders the combination of ER and the average power at the transmitter ineffective as a measure of communication link quality. This is because the average received light power can be nominal but modal dispersion in the communication medium may reduce the difference between the high and low signal levels at the receiver. Such a reduction in the difference between the high and low signal levels can severely degrade BER performance of the communication link.

SUMMARY

An embodiment of an optical receiver system provides a diagnostic measure of OMA at other than a signal output of the receiver. The optical receiver system includes an input coupled to an optical detector that generates an electrical current that corresponds to an optical signal at the input. The optical receiver system further includes a transimpedance amplifier and a circuit. The transimpedance amplifier receives the electrical current and generates an amplified voltage. The transimpedance amplifier applies an automatic gain control to ensure that the output of the transimpedance amplifier is not limited. That is, the automatic gain control makes sure that the transimpedance amplifier does not become saturated. The circuit receives the amplified voltage and an indication of the gain applied by the transimpedance amplifier. The circuit generates a difference of a first signal level and a second signal level as a function of the electrical current and the gain applied by the transimpedance amplifier. The circuit provides a diagnostic measure of OMA.

An alternative embodiment of an optical receiver system provides a diagnostic measure of OMA at other than a signal output of the receiver. The optical receiver system includes an input coupled to an optical detector that generates an electrical current in response to an optical signal at the input. The optical receiver system further includes a signal mirror, a transimpedance amplifier and a circuit. The signal mirror is coupled to the electrical current and forwards first and second representations of the electrical current at respective outputs of the signal mirror. The transimpedance amplifier receives the electrical current and generates an amplified voltage. The circuit receives a representation of the electrical current at an input of the circuit and generates a difference between an average of a first signal level and a second average of a second signal level. The difference provides a diagnostic measure of OMA at an output of the circuit.

An embodiment of a method for providing a diagnostic measurement of OMA at an optical receiver that utilizes automatic gain control includes the steps of applying a representation of an output of an optical detector to a circuit that determines a difference between a first signal level and a second signal level and buffering the difference between the first signal level and the second signal level received from the circuit.

The figures and detailed description that follow are not exhaustive. The disclosed embodiments are illustrated and described to enable one of ordinary skill to make and use the optical receivers and methods for providing a measure of OMA. Other embodiments, features and advantages of the optical receivers and methods will be or will become apparent to those skilled in the art upon examination of the following figures and detailed description. All such additional embodiments, features and advantages are within the scope of the systems and methods as defined in the accompanying claims.

BRIEF DESCRIPTION OF THE FIGURES

The systems and methods for diagnostic monitoring of OMA at an optical receiver that uses automatic gain control can be better understood with reference to the following figures. The components within the figures are not necessarily to scale, emphasis instead being placed upon clearly illustrating the principles of providing a measure of OMA at an output of an optical receiver that uses automatic gain control to prevent saturation of the transimpedance amplifier. Moreover, in the figures, like reference numerals designate corresponding parts throughout the different views.

DETAILED DESCRIPTION

An optical receiver monitors and outputs a voltage that represents the OMA of a received optical signal at the optical receiver. The voltage is a diagnostic measure of the quality of the optical communication link defined by an upstream transmitter, an optical medium and the optical receiver. The voltage provides a direct measure of signal strength, rather than an indirect calculation that uses one or more measures of a point of reference and the ER of the upstream transmitter to characterize the quality of the communication link. A direct measure of communication link quality provides the ability to track vertical eye closure due to inter-symbol interference (ISI) caused by increased transmitter rise/fall times, reduced transmitter ER and increased dispersion effects in a fiber medium, etc. As described above, diagnostic monitoring based on OMA is better correlated to BER performance of an optical communication link than monitors that use a measure of average optical input power. This is especially the case for optical communication links that use bandwidth-limited transmitters, bandwidth limited and/or relatively high-loss fiber media like polymer optical fiber (POF) and hard-cladded silica (HCS) fiber.

An optical receiver uses automatic gain control to support the dynamic range of POF and HCS communication media (1 mW to 1 µW or 0 dBm to −30 dBm) and provides a diagnostic measurement of OMA at other than a signal output. Two embodiments are presented. In a first embodiment, OMA, based on signal swing at an input to a signal-limiting amplifier (or post amplifier) in combination with an actual transimpedance gain setting is provided at a dedicated receiver output. A low-speed circuit (i.e., a circuit operating at a rate in the kHz range or slower) records an average of the high signal peaks and an average of the low signal peaks. Thus, the low-speed circuit provides a measure of the peak-to-peak signal swing at the input to the signal-limiting amplifier. The low-speed circuit combines the measure of the peak-to-peak signal swing with the gain of the transimpedance amplifier to generate an absolute measure of OMA at the receiver.

For example, if the light intensity at the optical detector is very low, the transimpedance gain setting will be at a maximum gain setting. Under these operating conditions, the signal swing at the output of the transimpedance amplifier will be a representation of the optical signal swing at the optical detector. When the light intensity increases to a point where the automatic gain control of the transimpedance amplifier starts to attenuate the signal to ensure that the output of the transimpedance amplifier is not limited (i.e., the transimpedance amplifier is not saturated), the output of the low-speed circuit is adjusted by the gain applied at the transimpedance amplifier to accurately track the optical signal swing at the optical detector. A driver provides an analog voltage at a non-data output of the receiver. The analog voltage can be related to a measure of link quality. Thus, for a particular receiver, a relationship between the analog voltage and OMA swing at the receiver can be established. In addition, once a measure of the receiver noise floor is recorded or characterized, a relationship between the OMA swing and BER for the communication link can be provided.

In a second embodiment, OMA, based on signal swing at an input to a transimpedance amplifier is provided at a dedicated receiver output. A signal or current mirror is inserted between the optical detector and a transimpedance amplifier that applies automatic gain control to ensure that the output of the transimpedance amplifier is not limited. A first output of the signal mirror is coupled to the transimpedance amplifier. A second output of the signal mirror is coupled to a fixed gain amplifier having a gain such that the output of the fixed gain amplifier will not saturate over the dynamic range of the receiver and a low-speed circuit that generates an average peak-to-peak signal swing. An optical receiver in accordance with this second embodiment will be preferably constructed with the signal mirror, transimpedance amplifier, fixed-gain amplifier, the low-speed circuit and the buffer being formed on a single substrate. The low-speed circuit provides a measure of the peak-to-peak signal swing at the output of the fixed gain amplifier. A driver coupled to an output of the low-speed circuit provides an analog voltage at a non-data output of the receiver. The analog voltage can be related to a measure of link quality.

Figure 3:
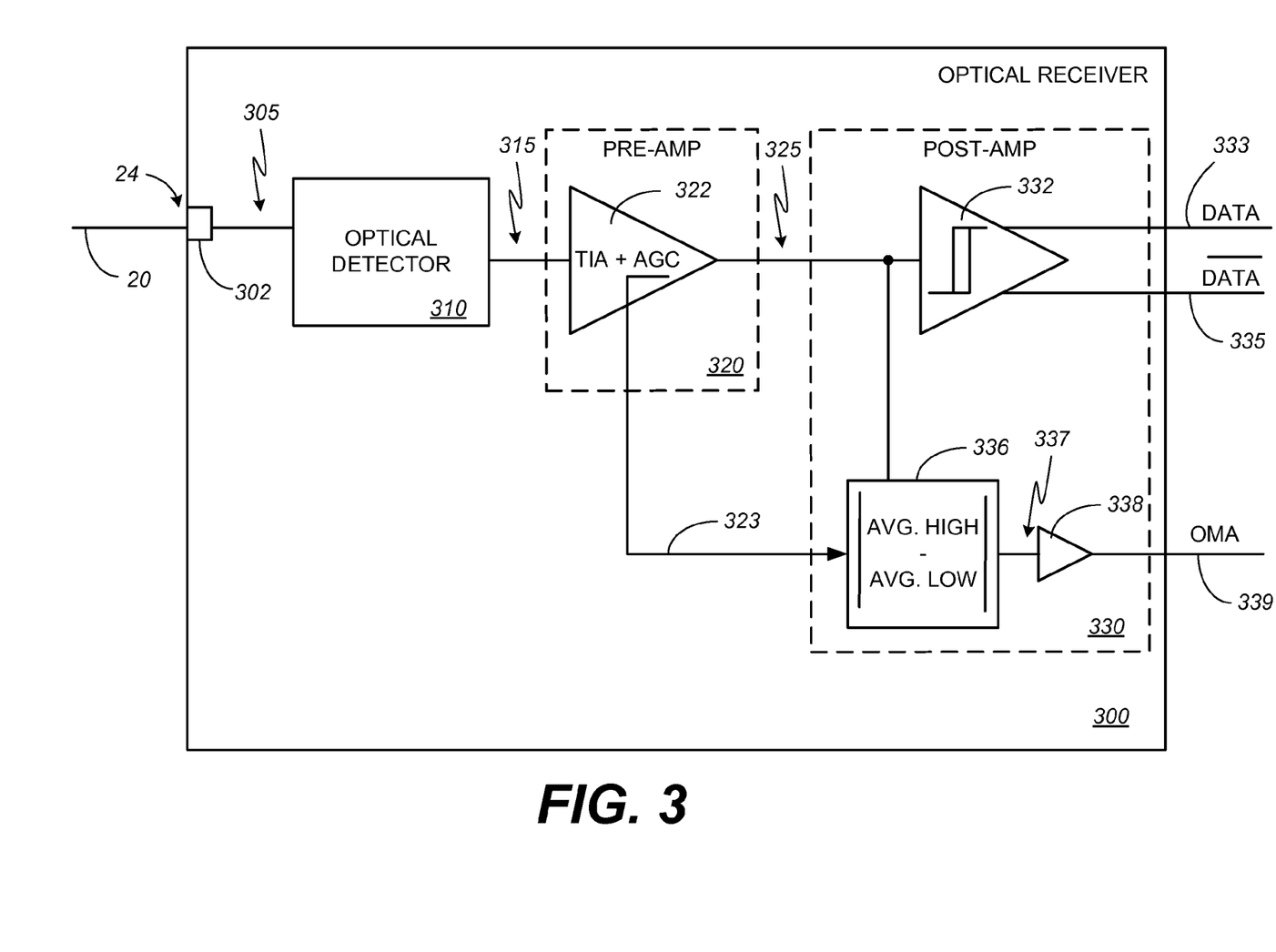
FIG. 3 is a schematic diagram of an embodiment of an improved optical receiver.

Turning now to the drawings, wherein like reference numerals designate corresponding parts throughout the drawings, reference is made to FIG. 3, which includes a schematic diagram of an embodiment of an improved optical receiver 300. The optical receiver 300 includes a series arrangement of an optical detector 310, a pre-amplifier 320 and a post-amplifier 330. The optical receiver 300 receives an optical signal at a second or output end 24 of an optical medium 20 and generates a first electrical signal labeled DATA on connection 333 that is an amplified version of the optical data signal received at input 302. The first electrical signal on connection 333 and the complement signal on connection 335 are limited or clamped between the logic high voltage and the logic low voltage. In addition to the first and second electrical signals, the optical receiver 300 generates a voltage on connection 339 (labeled OMA) that is a measure of the optical modulation amplitude at the input 302.

The optical detector 310 is coupled to the input 302 via an optical coupling mechanism 305. The optical coupling 305 can be a butt coupling, a refractive coupling, a fiber stub, etc. The optical detector 310 is further coupled to the pre-amplifier 320 via connection 315. The optical detector 310 is an optical-to-electrical signal converter. That is, the current on connection 315 is responsive to the time-varying light signal received via the input 302 and the optical coupling mechanism 305.

The transimpedance amplifier 322 receives the current on connection 315 and converts the same to a time-varying voltage on pre-amplifier output connection 325, which is coupled to a signal input of the post-amplifier 330. An indication of the gain is provided on connection 323 to the post-amplifier 330. The pre-amplifier 320 comprises a transimpedance amplifier 322 with automatic gain control. The pre-amplifier 320 is configured to dynamically apply the automatic gain control to ensure that the amplified voltage on connection 325 at the output of the pre-amplifier accurately reflects the time-varying optical signal swing at the input 302 without saturating the transimpedance amplifier 322.

The signal limiting post-amplifier 332 receives the amplified voltage on connection 325 and generates the first electrical signal labeled DATA on connection 333 and its complement (i.e., the second electrical signal) on connection 335. A relatively low-speed circuit 336 receives the amplified voltage on connection 325 and the indication of the gain applied by the transimpedance amplifier 322 on connection 323. The low-speed circuit 336 generates the difference of a first signal level and a second signal level. The difference of the first signal level and the second signal level is forwarded via connection 337 to a driver or buffer 338, which is coupled to the connection 339. The low-speed circuit 336 operates in the kHz range or slower. The low-speed circuit 336 determines the average high signal level at the output of the pre-amplifier 320 and the average low signal level at the output of the pre-amplifier 320 and forwards the difference of these average signal levels at its output. To provide an accurate representation of the optical signal swing at the input 302 of the optical receiver 300, the output of the low-speed circuit 336 is adjusted by the gain applied at the transimpedance amplifier 322. For example, if a gain factor of 0.1 is applied at the transimpedance amplifier 322 to ensure that the output voltage is not limited and the average peak-to-peak voltage swing measured by the circuit 336 is 40 mV, the circuit 336 multiplies the inverse of the gain by the peak-to-peak voltage swing and generates an output signal on connection 337 of 400 mV. The buffer 338 is provided to ensure that external monitoring equipment does not adversely affect the diagnostic measure of OMA on connection 339.

Figure 4:
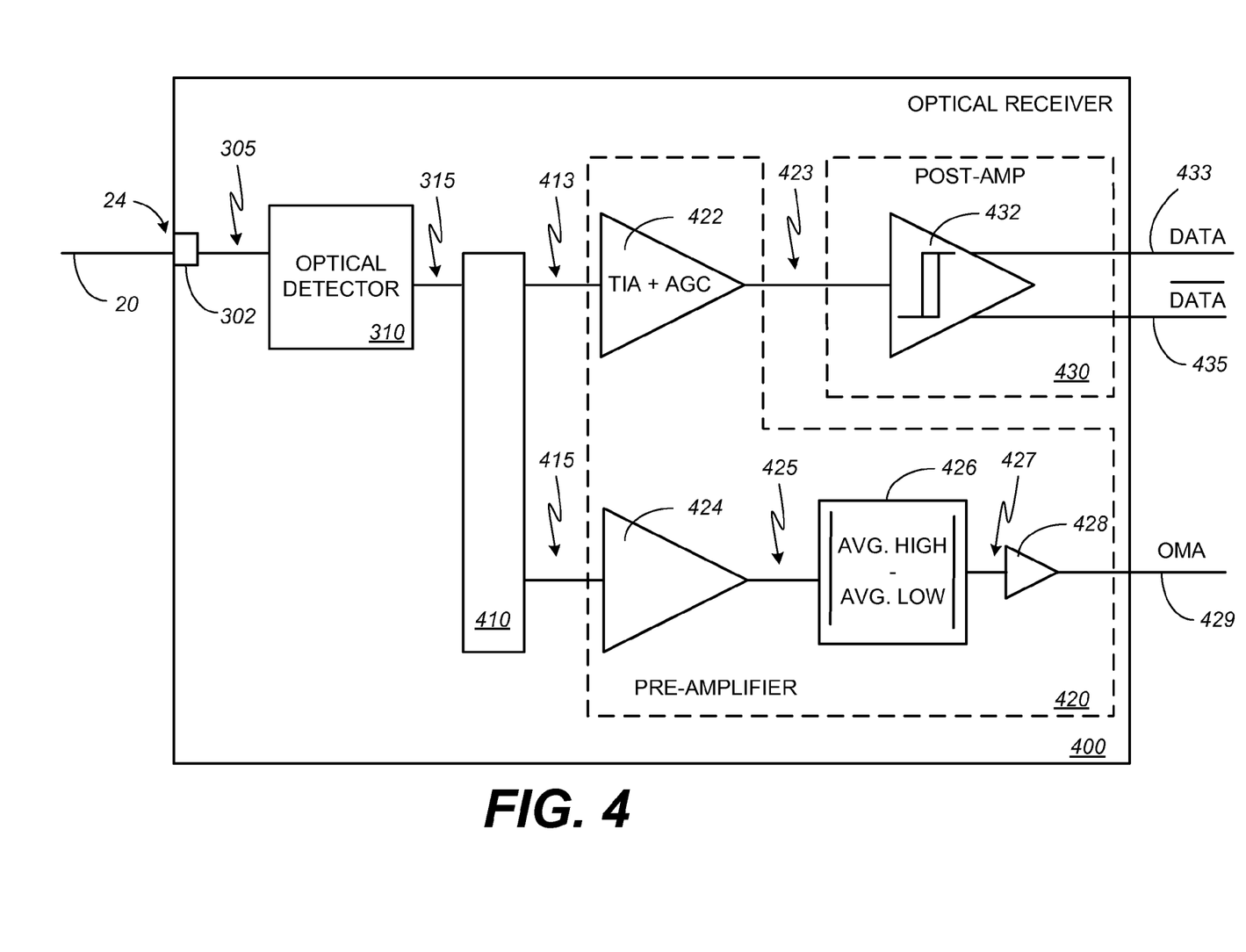
FIG. 4 is a schematic diagram of an alternative embodiment of an improved optical receiver.

FIG. 4 is a circuit diagram of an alternative embodiment of an improved optical receiver. The optical receiver 400 includes an arrangement of an optical detector 310, a signal mirror 410, a pre-amplifier 420 and a post-amplifier 430. The optical receiver 400 receives an optical signal at a second or output end 24 of an optical medium 20 and generates a first electrical signal labeled DATA on connection 433 that is an amplified version of the optical data signal received at the input 302. The first electrical signal on connection 433 and the complement signal on connection 435 are limited or clamped between the logic high voltage and the logic low voltage. In addition to the first and second electrical signals, the optical receiver 400 generates a voltage on connection 429 (labeled OMA) that is a measure of the optical modulation amplitude at the input 302.

The optical detector 310 is coupled to the input 302 via an optical coupling mechanism 305. The optical detector 310 is further coupled to the signal mirror 410 via connection 315. The optical detector 310 is an optical-to-electrical signal converter. That is, the current on connection 315 is responsive to the time-varying light signal received via the input 302 and the optical coupling mechanism 305.

The signal or current mirror 410 provides a first pre-amplifier input on connection 413 and a second pre-amplifier input on connection 415. The signal mirror 410 is a circuit designed to copy a current through one active device by controlling the current in another active device of the circuit. The signal mirror 410 keeps the output current on connection 413 and the output current on connection 415 constant regardless of pre-amplifier and post-amplifier loading (if any). The signal mirror 410 provides a representation of the current provided by the optical detector 310 on the connection 413 and the connection 415.

The first pre-amplifier input on connection 413 is coupled to a transimpedance amplifier 422 that receives the current on connection 413 and converts the same to a time-varying voltage on pre-amplifier output connection 423, which is coupled to a signal input of the post-amplifier 430. The transimpedance amplifier 422 dynamically applies automatic gain control to ensure that the amplified voltage on connection 423 at the output of the pre-amplifier 420 accurately reflects the time-varying optical signal swing at the input 302 without saturating the transimpedance amplifier 422.

An optical signal monitoring path within the pre-amplifier 420 includes an arrangement of a fixed gain amplifier 424, a low-speed circuit 426, and a driver or buffer 428. The fixed gain amplifier 424 receives the second pre-amplifier input on connection 415 and forwards a time-varying amplified voltage on connection 425. The fixed gain amplifier 424 is configured to provide a time-varying amplified voltage that is not limited over the dynamic range of the optical receiver 400. The low-speed circuit receives the amplified voltage on connection 425 and generates the difference of an average high signal level and an average low signal level. The difference of the average high signal level and the average low signal level is forwarded via connection 427 to the buffer 428, which is coupled to the connection 427. The low-speed circuit 426 operates in the kHz range or slower. The buffer 428 provides a measure of the OMA at other than a signal output of the optical receiver 400. The buffer 428 further ensures that any external monitoring equipment does not adversely affect the diagnostic measure of OMA on connection 429.

The signal limiting post-amplifier 432 receives the amplified voltage on connection 423 and generates the first electrical signal labeled DATA on connection 433 and its complement (i.e., the second electrical signal) on connection 435. In this way, the post amplifier 430 generates a limited or clamped version of the optical signal received at the input 302. The first and second electrical signals on connection 433 and connection 435 are limited or clamped to the voltage levels corresponding to a logic high and a logic low, respectively.

Figure 5:
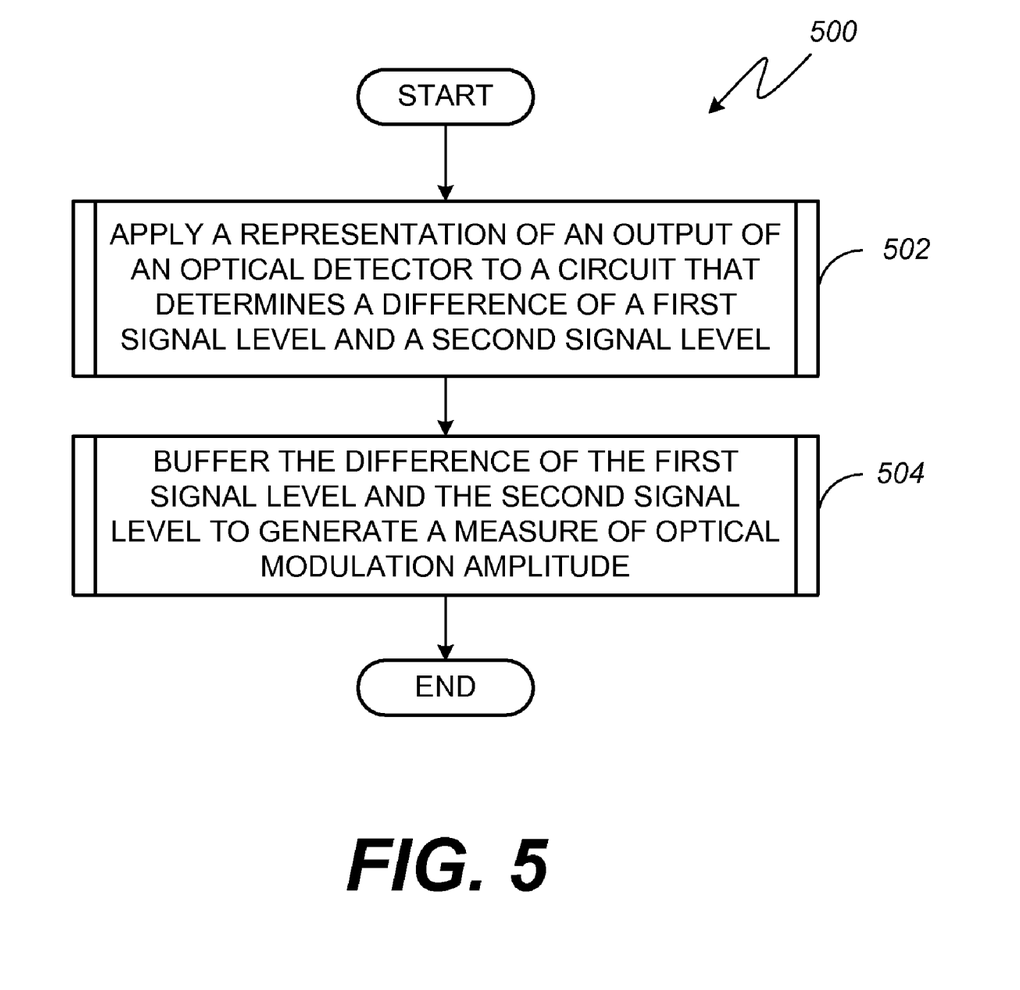
FIG. 5 is a flow chart illustrating a method for providing a diagnostic measure of OMA in a receiver that uses automatic gain control.

FIG. 5 is a flow chart illustrating a method 500 for providing a diagnostic measure of OMA in an optical receiver that uses automatic gain control. The method 500 begins with block 502 where a representation of an output of an optical detector is applied to a circuit that determines a difference between a first signal level and a second signal level. Thereafter, as indicated in block 504, the difference of the first signal level and the second signal level provided by the circuit is buffered. The buffered difference of the first signal level and the second signal level is a diagnostic measure of OMA.

Figure 6:
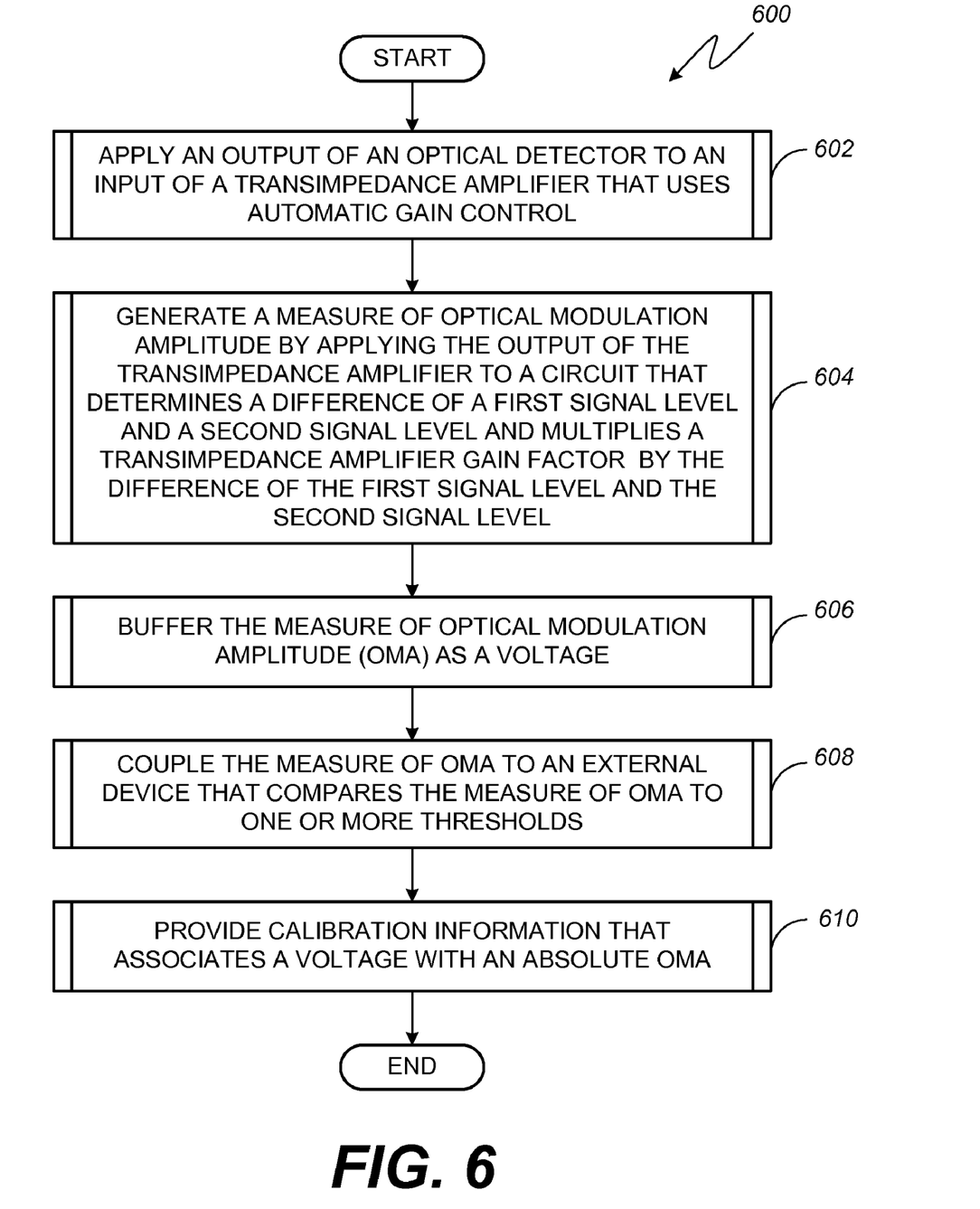
FIG. 6 is a flow chart of an embodiment of a method for providing a diagnostic measure of OMA in a receiver that uses automatic gain control.

FIG. 6 is a flow chart illustrating an embodiment of a method 600 for providing a diagnostic measure of OMA in an optical receiver that uses automatic gain control. The method 600 begins with block 602 where an output of an optical detector is applied to a transimpedance amplifier that uses automatic gain control. In block 604, the optical receiver generates a measure of OMA by applying the output of the transimpedance amplifier to a circuit that determines a difference between a first signal level and a second signal level. In addition, the circuit generates a measure of OMA as a function of the gain applied at the transimpedance amplifier and the difference between the first signal level and the second signal level. As explained above, the product of a gain factor and the difference is a measure of OMA at the optical detector of the receiver.

Thereafter, as indicated by block 606, the OMA as represented by an analog voltage, is buffered. In block 608, the buffered OMA signal is coupled to an external apparatus that compares the buffered OMA signal to one or more thresholds. In block 610 calibration information that associates a voltage level with an absolute OMA is provided.

Figure 7:
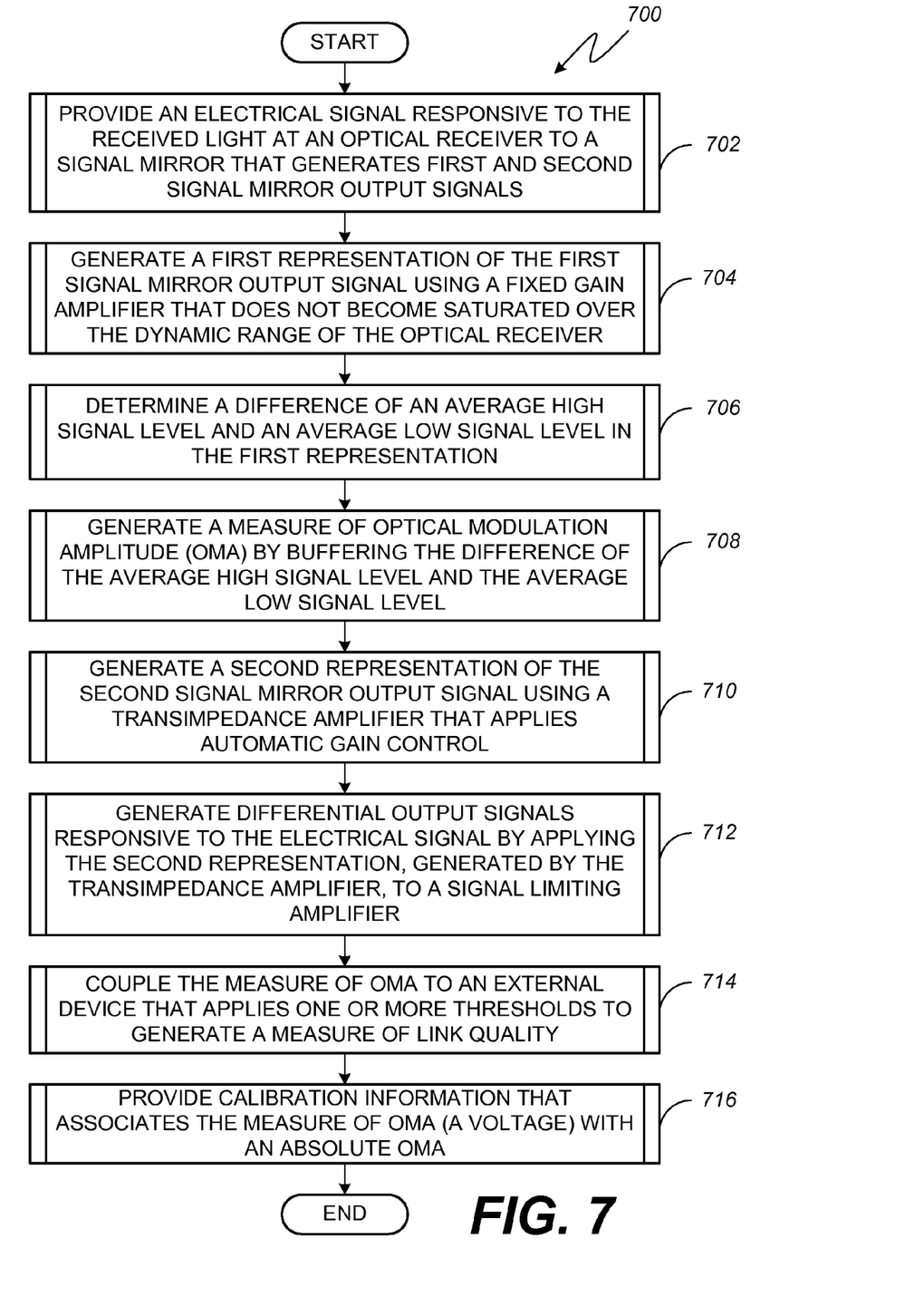
FIG. 7 is a flow chart of an alternative embodiment of a method for providing a diagnostic measure of OMA in a receiver that uses automatic gain control.

FIG. 7 is a flow chart of an alternative embodiment of a method 700 for providing a diagnostic measure of OMA in an optical receiver that uses automatic gain control. The method 700 begins as shown in block 702, where an electrical signal responsive to the received light at an optical receiver is provided to a signal mirror that generates first and second signal mirror output signals. In block 704, a first representation of the first signal mirror output signal is generated using a fixed gain amplifier that does not become saturated over the dynamic range of the optical receiver. In block 706, a difference of an average high signal level and an average low signal level in the first representation of the first signal mirror is determined. Thereafter, as indicated in block 708, a measure of OMA is generated by buffering the difference of the average high signal level and the average low signal level. In block 710, a second representation of the second signal mirror output signal is generated using a transimpedance amplifier that applies automatic gain control. In block 712, differential output signals, responsive to the electrical signal are generated by applying the second representation to a signal limiting amplifier. In block 714, the measure of OMA is coupled to an external device (i.e., an apparatus other than the optical receiver) that applies one or more thresholds to generate a measure of optical communication link quality. In block 716, calibration information that associates the measure of OMA with an absolute OMA at the optical receiver is provided. The particular sequence of the steps or functions in blocks 702 through 712 is presented for illustration. It should be understood that the order of the steps or functions in blocks 702 through 712 can be performed in any other suitable order. The steps or functions in block 714 and block 716 are optional.

While various embodiments of the optical receiver systems and methods for providing a measure of OMA at an optical receiver that uses automatic gain control have been described, it will be apparent to those of ordinary skill in the art that many more embodiments and implementations are possible that are within the scope of this disclosure. Accordingly, the described optical receiver systems and methods for providing a diagnostic measure of OMA at an optical receiver that uses automatic gain control are not to be restricted or otherwise limited except in light of the attached claims and their equivalents.

What is claimed is:

1. A method for providing a diagnostic measurement of optical modulation amplitude at an optical receiver that utilizes a transimpedance amplifier with automatic gain control, the method comprising:
  applying a representation of an output of an optical detector to a circuit that determines an absolute value of a difference between a first average signal level and a second average signal level; and
  buffering the absolute value of the difference between the first average signal level and the second average signal level received from the circuit.

2. The method of claim 1, further comprising multiplying the absolute value of the difference between the first average signal level and the second average signal level with a gain factor applied by the transimpedance amplifier.

3. The method of claim 2, further comprising applying an output of the transimpedance amplifier to an input of a signal limiting post amplifier.

4. The method of claim 3, further comprising generating a differential output responsive to the representation of an output from the optical detector.

5. The method of claim 1, further comprising:
  inserting a signal mirror at the output of the optical detector; and
  applying a first output of the signal mirror at an input of a transimpedance amplifier and at an input of a fixed gain amplifier inserted between the signal mirror and the circuit, the fixed gain amplifier providing an amplified representation of the output of the optical detector that is not limited over the dynamic range of the optical receiver.

6. The method of claim 1, wherein buffering the absolute value of the difference between the first average signal level and the second average signal level comprises generating an optical modulation amplitude signal.

7. The method of claim 6, further comprising coupling the optical modulation amplitude signal to an external apparatus that compares the optical modulation amplitude signal to one or more thresholds.

8. The method of claim 6, further comprising providing information that associates a voltage level with an absolute optical modulation amplitude.

9. An optical receiver system, comprising:
  an input coupled to an optical detector that generates an electrical current in response to an optical signal at the input;
  a transimpedance amplifier arranged to receive the electrical current at a transimpedance amplifier input and configured to generate an amplified voltage; and
  a circuit arranged to receive the amplified voltage, and determine an absolute value of a difference between a first average signal level and a second average signal level that is different from the first average signal level, the circuit providing a diagnostic measure of an optical modulation amplitude at an output of the circuit.

10. The optical receiver system of claim 9, further comprising a buffer coupled to the output of the circuit, the buffer providing a representation of the diagnostic measure of the optical modulation amplitude at other than a signal output of the receiver system.

11. The optical receiver system of claim 9, wherein the transimpedance amplifier applies an automatic gain control to the electrical current.

12. The optical receiver system of claim 9, further comprising a post amplifier configured to receive the amplified voltage from the transimpedance amplifier and generate a limited representation of the optical signal.

* * * * *